(12) United States Patent
Balasuriya

(10) Patent No.: US 8,799,464 B2
(45) Date of Patent: Aug. 5, 2014

(54) MULTI-MODAL COMMUNICATION USING A SESSION SPECIFIC PROXY SERVER

(75) Inventor: Senaka Balasuriya, Westmont, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2434 days.

(21) Appl. No.: 10/034,794

(22) Filed: Dec. 28, 2001

(65) Prior Publication Data

US 2003/0140113 A1 Jul. 24, 2003

(51) Int. Cl.
*G06F 15/173* (2006.01)

(52) U.S. Cl.
USPC .......................................... 709/225; 709/227

(58) Field of Classification Search
USPC .................................................. 709/225, 227
See application file for complete search history.

(56) References Cited

U.S. PATENT DOCUMENTS

| | | | |
|---|---|---|---|
| 6,298,380 B1 | 10/2001 | Coile et al. | |
| 6,473,406 B1 | 10/2002 | Coile et al. | |
| 6,477,543 B1 | 11/2002 | Huang et al. | |
| 6,643,778 B1* | 11/2003 | Nakazawa | 726/11 |
| 6,708,217 B1 | 3/2004 | Colson et al. | |
| 6,754,709 B1* | 6/2004 | Gbadegesin | 709/227 |
| 6,798,755 B2 | 9/2004 | Lillie et al. | |
| 7,210,098 B2 | 4/2007 | Sibal et al. | |
| 7,216,351 B1 | 5/2007 | Maes | |
| 7,328,269 B1 | 2/2008 | Danner et al. | |
| 2002/0065944 A1 | 5/2002 | Hickey et al. | |
| 2002/0184373 A1 | 12/2002 | Maes | |
| 2002/0194388 A1* | 12/2002 | Boloker et al. | 709/310 |
| 2003/0208570 A1 | 11/2003 | Lapidous | |
| 2005/0261909 A1 | 11/2005 | Sienel et al. | |
| 2006/0020704 A1 | 1/2006 | Balasuriya | |
| 2006/0101147 A1 | 5/2006 | Balasuriya | |
| 2006/0106935 A1 | 5/2006 | Balasuriya | |
| 2009/0013035 A1 | 1/2009 | Hosn et al. | |

FOREIGN PATENT DOCUMENTS

KR 20010076789 A 8/2001

OTHER PUBLICATIONS

Maes, Stephane H., "Multi-modal Web IBM Position," W3C/WAP Workshop, IBM Human Language Technologies, pp. 1-9.

* cited by examiner

*Primary Examiner* — Yves Dalencourt
(74) *Attorney, Agent, or Firm* — McDermott Will & Emery LLP

(57) ABSTRACT

A method and apparatus for multi-modal communication includes a controller (236) operably coupled to at least one multi-modal session proxy server (226). On a per multi-modal session basis, the controller (236) provides the multi-modal session proxy server (226) with a multi-modal proxy identifier (138). The multi-modal proxy identifier (138) is then provided to at least one browser with a per session multi-modal proxy evaluator (220) having a browser proxy identifier (140) wherein the browser proxy identifier (140) is evaluated in view of the multi-modal proxy identifier (138). The multi-modal session proxy server (226) then receives an information request (231) from the browser with per session multi-modal proxy evaluator (220) wherein the requested information is fetched from a content server (240). When the requested information is retrieved, a multi-modal synchronization coordinator (122) notifies the other browser with per session multi-modal proxy evaluator (232), via a multi-modal synchronization interface (234).

13 Claims, 7 Drawing Sheets

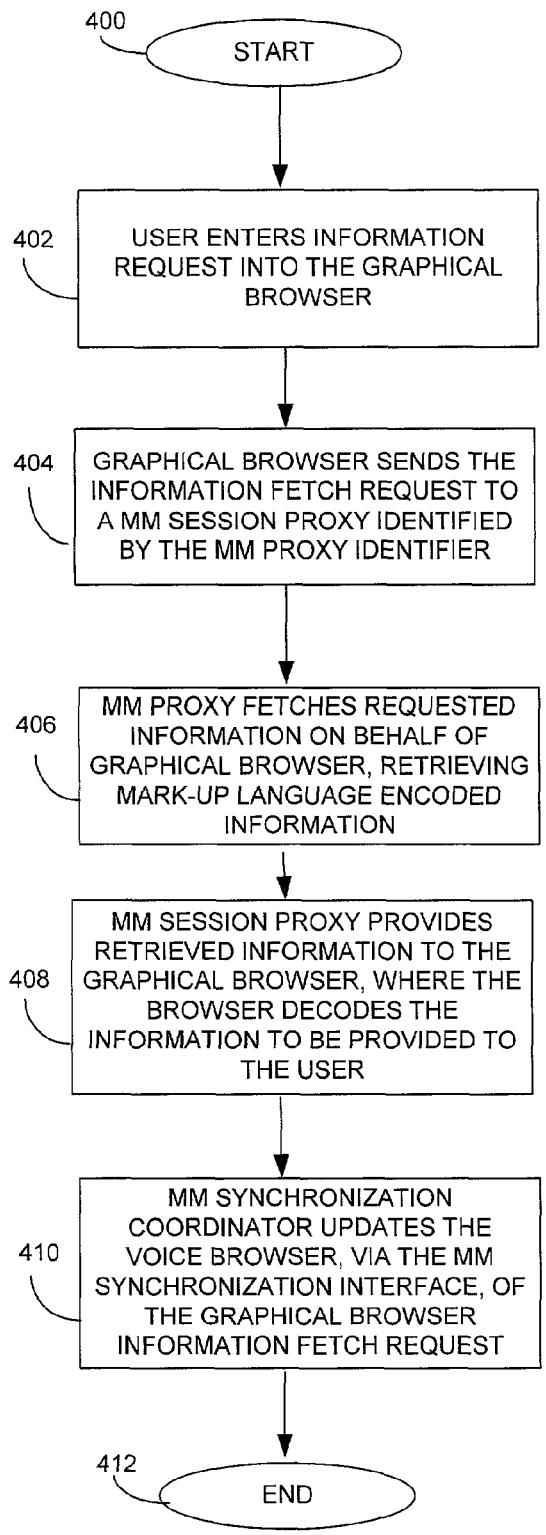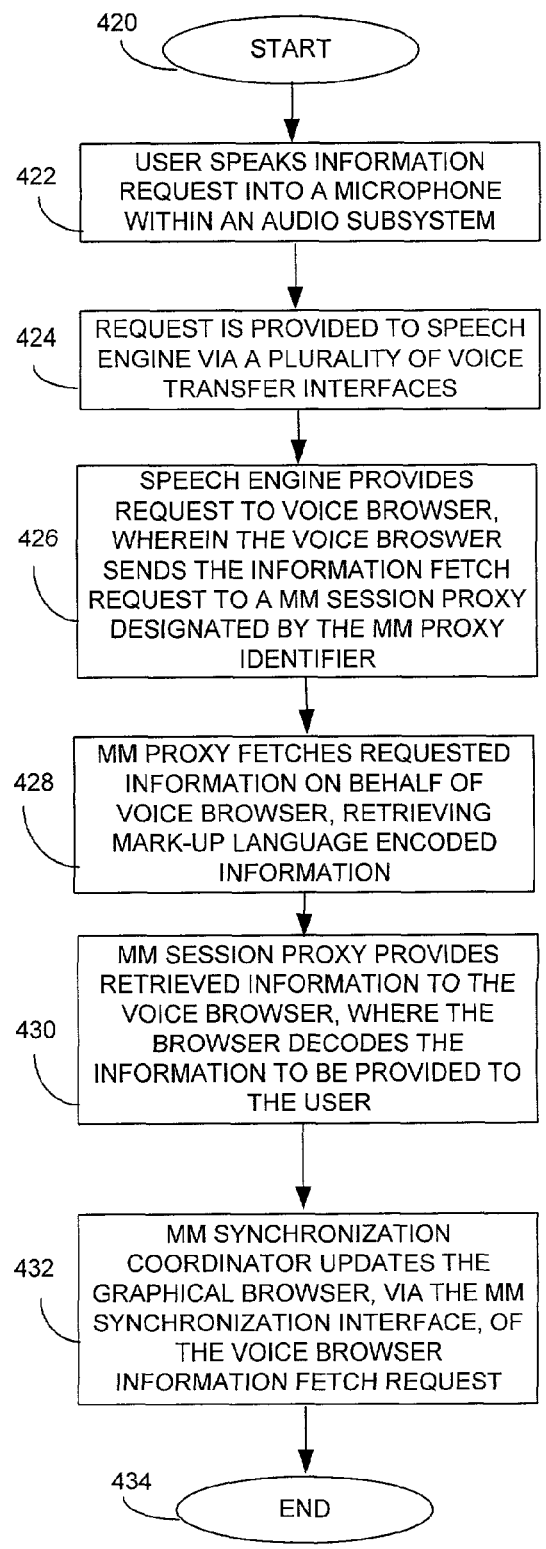
FIG. 7
FIG. 8

MULTI-MODAL COMMUNICATION USING A SESSION SPECIFIC PROXY SERVER

FIELD OF THE INVENTION

The invention relates generally to communication devices and methods and more particularly to communication devices and methods that employ proxy servers.

BACKGROUND OF THE INVENTION

An emerging area of technology involving terminal devices, such as handheld devices, mobile phones, laptops, PDAs, internet appliances, desktop computers, or other suitable devices, is the application of multi-modal interaction for access to information and services. Typically resident on the terminal device is at least one browser, wherein the browser is a program which allows the user to enter fetch requests, receive fetched information, and navigate through content servers via internal, e.g. intranet, or external, e.g. internet, connections, and present information to the user. The browser may be a graphical browser, voice browser, JAVA® based application, software program application, or any other suitable browser as recognized by one of ordinary skill in the art.

Multi-modal technology allows a user to access information, such voice, data, encryption, video, audio or other information, and services such as email, weather updates, bank transactions, and news through one or more browsers. More specifically, the user may submit an information fetch request in one or more modalities, such as speaking a fetch request into a microphone, and the user may then receive the fetched information in either the first mode or a second mode, such as viewing the information on a display screen. Within the terminal device, the browser works in a manner similar to a standard web browser or program application, such as NETSCAPE NAVIGATOR®, resident on a computer connected to a network. The browser receives an information fetch request, typically in the form of a universal resource indicator (URI), a bookmark, touch entry, key-entry, voice command, etc. The browser then translates the information fetch request and sends this request to the appropriate content server, such as a commercially available content server, such as a weather database via the internet, an intranet server or any other suitable network. The information is then provided back to the browser, typically encoded as mark-up language for the browser to decode, such as hypertext mark-up language (HTML), wireless mark-up language (WML), extensive mark-up language (XML), Voice eXtensible Mark-up Language (VoiceXML), Extensible HyperText Markup Language (XHTML), or other such mark-up languages.

In multi-modal communication, each browser may directly fetch the requested information from the content server. Wherein, each browser may access the same content server at the same time for the same requested information, to provide synchronization between the browsers. This increases the number of "hits" on a content server, reduces available system bandwidth, and can increase costs and decrease efficiency of the multi-modal system. Therefore, it may be more efficient to cache the requested information at an intermediate memory location, such that the content server may be accessed once, and the other browsers may then access the intermediate memory location.

Typically, a computer resident on a network fetches the information request through a proxy server commonly known as a firewall server. Wherein, a proxy server is a computer having a proxy, an application running on a gateway that relays packets of information between a trusted client, such as the networked computer, and an untrusted host, such as the third party content server. The proxy server may act as the intermediate memory location for the multi-modal system.

Generally, a browser has a static proxy address that is independent of a particular session. When the browser is first installed on a terminal, computer or other device, a browser proxy address is assigned and manually inserted therein, via a graphical user interface (GUI). Moreover, the proxy address may be manually changed by a user via a GUI, after installation. Typically, the proxy address refers to a specific proxy server, such as a firewall server, allowing a user to safely access information from the various content servers. Therefore, whenever a browser receives a URI request, that request is transmitted through the static proxy server.

Concurrent with the emergence of multi-modal technology, concerns arise regarding different types of browsers (e.g. graphical, voice, etc.) seeking information from a variety of different content servers. If a first browser, such as a graphical browser, in the terminal device retrieves a specific set of information, it is important to synchronize the second browser, such as a voice browser on the network device, of the first browser's fetch request and successful retrieval. If the different browsers are not synchronized properly, a user may encounter problems when switching between browsers or when using multiple browsers to input commands or fetch requests.

A proposed solution is the emergence of a multi-modal synchronization coordinator, which provides synchronization for multiple browsers in a multi-modal system. Even with the synchronization of the browsers within the multi-modal system, a problem still arises due to the browsers' generally static multi-modal proxy address. In addition to possible available bandwidth problems as discussed above, the user is required to provide information fetch requests through a static multi-modal proxy server, regardless of the user's location. For example, if the browser on a mobile phone has a statically assigned proxy server that is located in Chicago, but the mobile phone is being used in Atlanta, then the information fetch request from the browser has to be sent through the proxy server located in Chicago and then routed back to Atlanta. This may reduce system efficiency.

As such, there exists a need for an improved multi-modal proxy device and method.

BRIEF DESCRIPTION OF THE DRAWINGS

The invention will be more readily understood with reference to the following drawings wherein:

FIG. 7 illustrates a flow chart representing a method for the dynamic evaluation of a multi-modal session proxy identifier within a graphical browser, and the fetching of an information fetch request, in accordance with one embodiment of the present invention.

FIG. 8 illustrates a flow chart representing a method for the dynamic evaluation of a multi-modal session proxy for a voice browser, and the fetching of an information fetch request, in accordance with one embodiment of the present invention.

DETAILED DESCRIPTION OF A PREFERRED EMBODIMENT OF THE INVENTION

Figure 1:
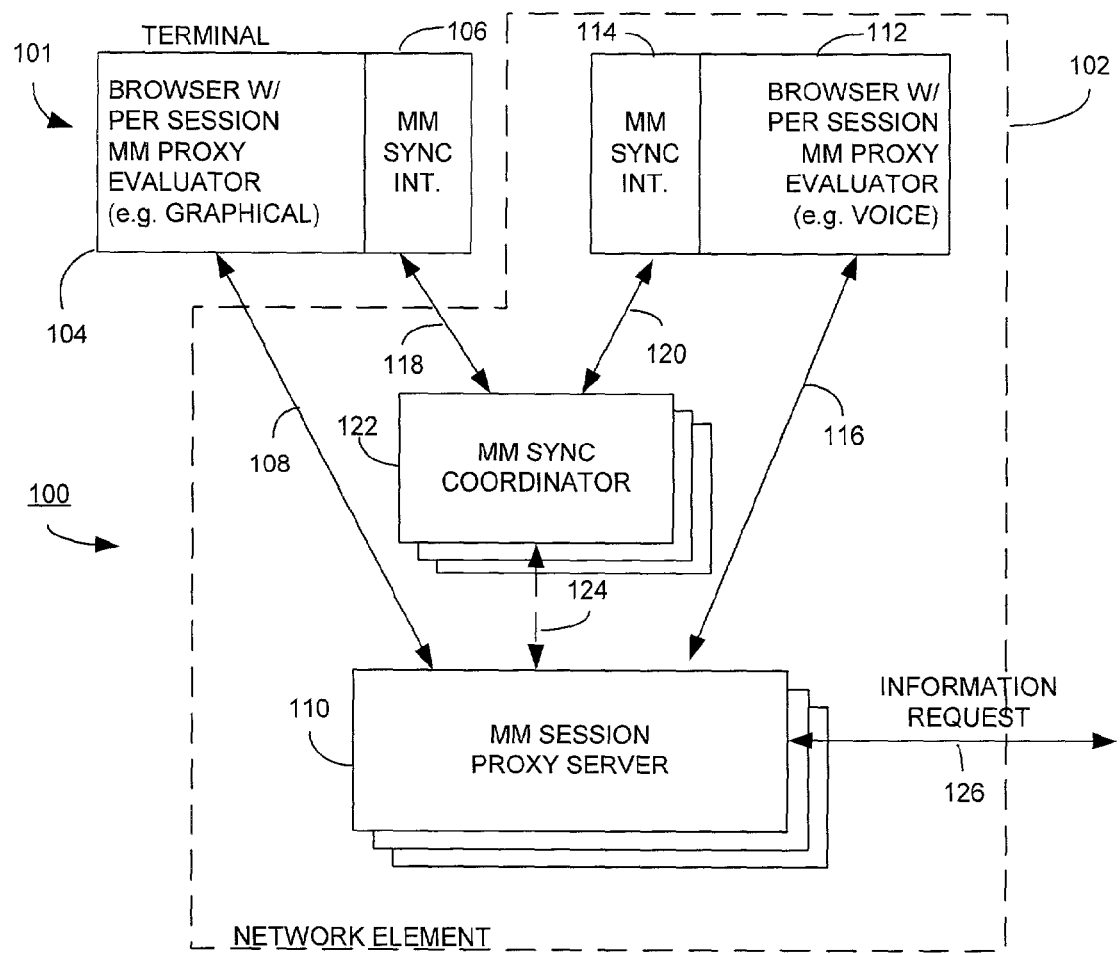
FIG. 1 illustrates a block diagram of a system for multi-modal communication using a session specific proxy server, in accordance with one embodiment of the present invention.

Generally, a system and method provides multi-modal communication through a controller and at least one multi-modal session proxy server, having a proxy address, operably coupled to the controller. The controller determines, on a per multi-modal session basis, a multi-modal proxy identifier, wherein the multi-modal proxy identifier represents the proxy address of the multi-modal session proxy server.

At least one browser, such as a graphical browser and/or a voice browser, is operably coupled to the multi-modal session proxy server. When the controller determines the multi-modal proxy identifier, which represents the multi-modal session proxy server for the multi-modal communication session, the multi-modal proxy identifier is provided to the browser. The browser has a browser proxy identifier that contains a proxy address for a proxy server. When the browser receives the multi-modal proxy identifier, the browser evaluates the browser proxy identifier in response to the multi-modal proxy identifier. Thereby, the browser proxy identifier is dynamically updated on a per session basis. Moreover, a multi-modal session is defined as an interactive period where the multi-modal browsers are actively engaged with a network element and with at least one content server. Similar to a telephone session, the session begins when a transceiver connects with a receiver, the session is active as long as the connection is maintained, and the session is ended as the termination of the connection.

The controller is further operably coupled to at least one load balancer. The load balancer determines, or is otherwise informed of, the available bandwidth for each of the at least one multi-modal session proxy servers. Based on this determination, the controller determines the multi-modal session proxy server for the multi-modal session and assigns the multi-modal proxy identifier to the multi-modal session proxy server address. Whereupon, the multi-modal proxy identifier is then provided to the at least one browser.

Moreover, the system and method provide for the synchronization of multiple browsers within a multi-modal communication session. A multi-modal synchronization coordinator is operably coupled the multi-modal session proxy server. Furthermore, the multi-modal session proxy server is operably coupled to a graphical browser and a voice browser. The graphical browser is operably coupled to a graphical browser multi-modal synchronization interface and the voice browser is operably coupled to a voice browser multi-modal synchronization interface. Moreover, the graphical browser multi-modal synchronization interface and the voice browser multi-modal synchronization interface are both operably coupled to the multi-modal synchronization coordinator.

When an information request is provided by one of the browsers, such as the graphical browser, the request is provided to the multi-modal session proxy server designated by the multi-modal proxy identifier. The multi-modal session proxy server retrieves the requested information and provides the information to the proper browser, such as the voice browser. When the requested information is retrieved, the multi-modal session proxy server provides the requested information to the multi-modal synchronization coordinator, which thereupon sends the information to all the other multi-modal browsers, such as the graphical browser, thus synchronizing the multi-modal browsers through the multi-modal synchronization interfaces, such as the graphical browser through the graphical browser multi-modal synchronization interface.

FIG. 1 illustrates one example of an apparatus 100 that provides a multi-modal session using a dynamically updated multi-modal session proxy. The apparatus 100 comprises a terminal 101 operably coupled to a network element 102. More specifically, the terminal 101 contains a browser with a per session multi-modal proxy evaluator 104, such as a graphical browser, and a multi-modal synchronization interface 106. The browser with a per session multi-modal proxy evaluator 104 is resident on the terminal 101 and operably coupled, via connection 108, to a multi-modal session proxy server 110. However, it will be recognized that other browsers, such as a voice browser, may be used. As illustrated, the multi-modal session proxy server 110 is a session specific designated proxy server, and one of a plurality of multi-modal session proxies within the network element 102.

Resident within the network element 102 is another browser having a per session multi-modal proxy evaluator 112, such as a voice browser, and a multi-modal synchronization interface 114. Similar to the terminal browser with per session multi-modal proxy evaluator 104, the network element browser with per session multi-modal proxy evaluator 112 is operably coupled to the multi-modal session proxy server 110, via connection 116. Moreover, both the terminal multi-modal synchronization interface 106 and the network element multi-modal synchronization interface 114 are operably coupled, via connections 118 and 120 respectively, to a multi-modal synchronization coordinator 122 resident within the network element 102. As illustrated in FIG. 1, the multi-modal synchronization coordinator 122 may be one of a plurality of multi-modal synchronization coordinators designated for the multi-modal session. Moreover, the multi-modal synchronization coordinator 122 is operably coupled to the multi-modal session proxy server 110 such that when a fetch request is successfully retrieved, the multiple browsers may be synchronized, as discussed below.

As recognized by one of ordinary skill in the art, the browser with per session multi-modal proxy evaluator 112 located on the network element 102, may also be resident on the terminal 101. In the example of a voice browser as the network element browser with per session multi-modal proxy evaluator, due to current processing requirements associated with a voice browser, including speech recognition requirements, it may be more efficient to place the browser with per session multi-modal proxy evaluator 112 and the multi-modal synchronization interface 114 within the network element 102, but it is within the scope of the present invention for these elements, among others, to be resident on the terminal 101. Also recognized by one of ordinary skill in the art, many elements for the interaction of the terminal 101 and network element 102 have been omitted for clarity purposes only.

When a user inputs an information request, such as a URI request, through one of the browsers, the request is provided to the multi-modal session proxy server 110. Whereupon the information request 126 is further provided, via the multi-modal session proxy server 110 to a content server (not shown). The network element 102 is operably coupled to at least one content server, (not shown), such as a database via an intranet connection, a commercial website via an internet connection, or any other type of content server. The requested information may then be extracted from the server and provided back to the browser via the multi-modal session proxy server 110.

In accordance with one embodiment of the present invention, when the information request 126 has been executed and the requested information is provided back to the browser with per session multi-modal proxy evaluator, such as 104 or 112, via the multi-modal session proxy server 110, the multi-modal synchronization coordinator notifies the other browser with per session multi-modal proxy evaluator, such as 112 or 104 respectively, of retrieval of the requested information. In one embodiment, the other browser with per session multi-modal proxy evaluator, such as 112 or 104, then sends an identical fetch request to the multi-modal session proxy server 110, wherein the proxy server 110 provides the requested information, cached within the multi-modal proxy server 110 to the browser with per session multi-modal proxy evaluator, such as 112 or 104.

For example, if a user provides a URI request through the terminal browser with per session multi-modal proxy evaluator 104 and the retrieved information is provided to the network element browser with per session multi-modal proxy evaluator 112, the multi-modal synchronization coordinator 122 would then provide, via connection 118, the terminal multi-modal synchronization interface 106 a notification of successful information request for the network element browser with per session multi-modal proxy evaluator 112. The network element browser with per session multi-modal proxy evaluator 112 may then access the retrieved information currently cached with the multi-modal session proxy server 110. Therefore, both the terminal browser with per session multi-modal proxy evaluator 104 and the network element browser with per session multi-modal proxy evaluator 112 are synchronized, wherein a user may actively switch between browsers and be at the same interaction stage without having to re-enter any previously entered information.

Figure 2:
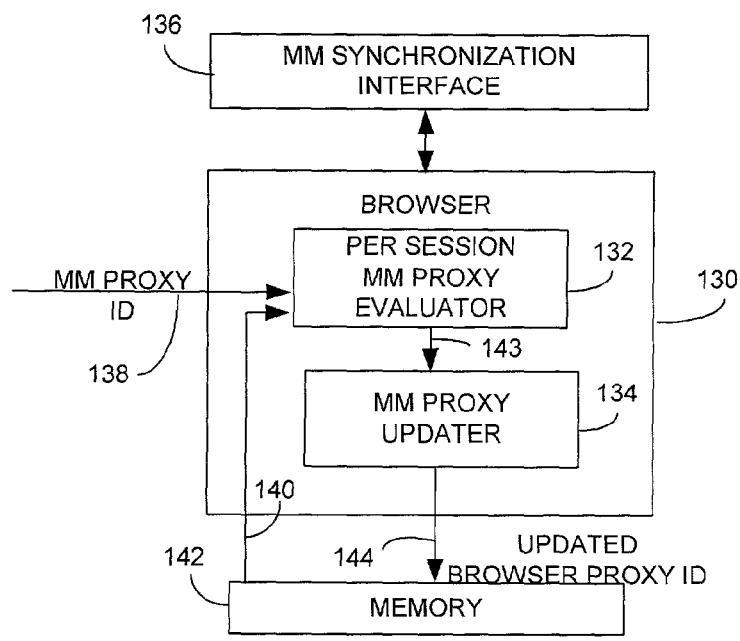
FIG. 2 illustrates a block diagram of a browser in accordance with one embodiment of the present invention.

FIG. 2 illustrates a multi-modal browser with per session multi-modal proxy evaluator 130, similar to the browsers with per session multi-modal proxy evaluator 104 and 112 illustrated in FIG. 1. The browser 130 has a per session multi-modal proxy evaluator 132 operably coupled to a multi-modal proxy updater 134, which may be resident within the browser itself.

The browser with per session multi-modal proxy evaluator 130 is also operably coupled to a multi-modal synchronization interface 136, similar to the multi-modal synchronization interfaces 106 and 114 of FIG. 1. The browser 130 receives a multi-modal proxy identifier 138 from the multi-model session proxy server, not shown. Within the browser 130, the per session multi-modal proxy evaluator 132 receives the multi-modal proxy identifier 138 and evaluates the multi-modal proxy identifier with regards to the browser proxy identifier 140 provided to the per session multi-modal proxy evaluator 132 from a memory 142. The per session multi-modal proxy evaluator 132 compares the multi-modal proxy identifier 138 with the browser proxy identifier 140. If the multi-modal proxy identifier 138 is different from the browser proxy identifier 140, the per session multi-modal proxy evaluator 132 provides the multi-modal proxy identifier to the multi-modal proxy updater 134, via connection 143, to be designated as the new browser proxy identifier. Thereupon, the multi-modal proxy updater 134 then provides the new browser proxy identifier 144, equivalent to the multi-modal proxy identifier 138, to the memory 142, thereby overwriting the previous multi-modal session browser proxy identifier.

In the event the multi-modal proxy identifier is equivalent to the previous browser proxy identifier from the previous multi-modal session, the multi-modal proxy updater 134 is not updated and the browser 130 uses the previous browser proxy identifier already resident within the memory 142. In another embodiment of the present invention, the per session multi-modal proxy evaluator 132 may automatically update the multi-modal proxy identifier 138, regardless of the previous browser proxy identifier 140.

Figure 3:
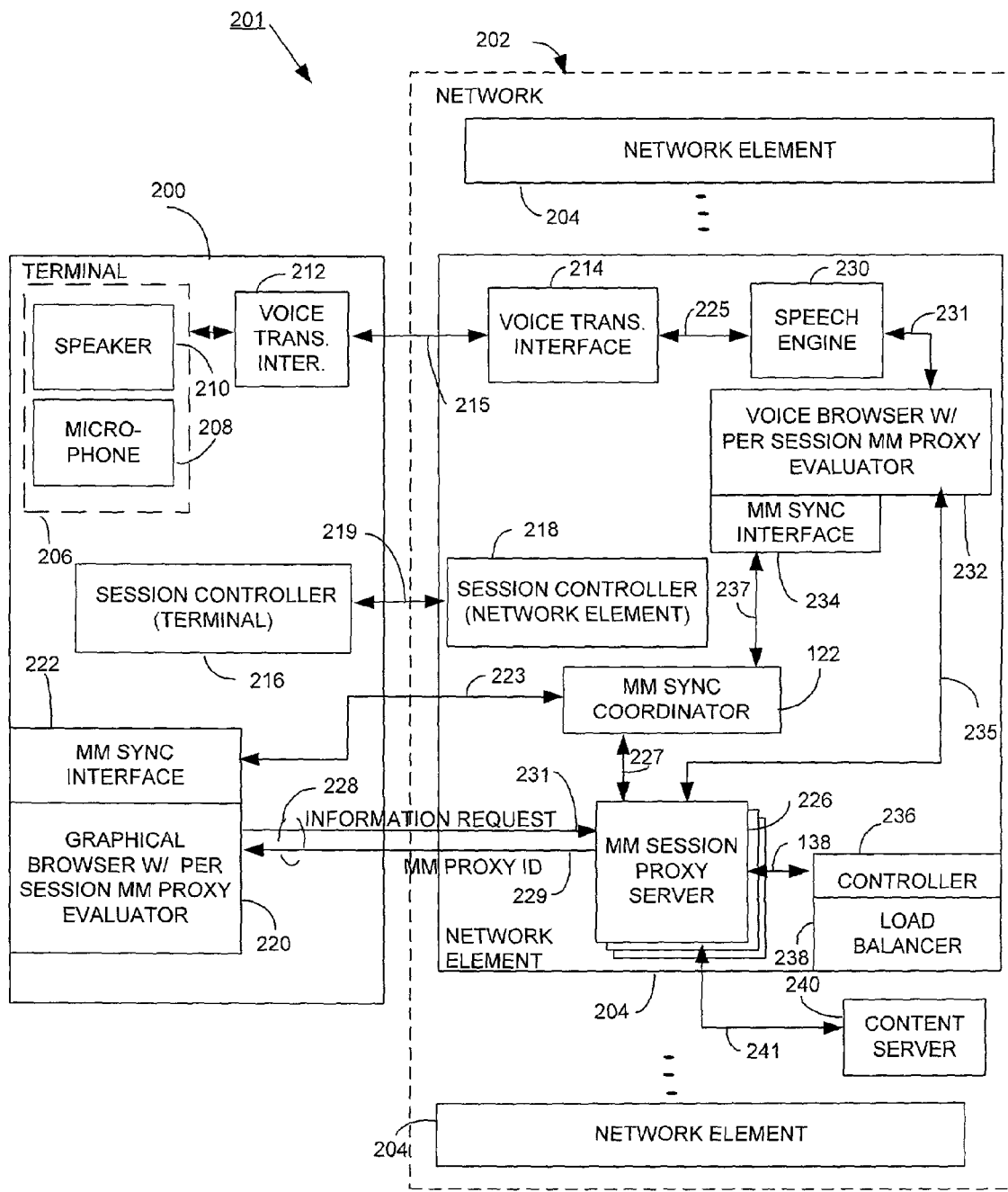
FIG. 3 illustrates a block diagram of a system for multi-modal communication using a session specific proxy server, in accordance with one embodiment of the present invention.

FIG. 3 illustrates an apparatus 201 providing for a multi-modal session between a terminal 200 and a network 202 having a plurality of network elements 204 wherein the terminal 200 is operably coupled to a specific network element 204. The terminal 200 has an audio subsystem 206 that consists of a microphone 208 and a speaker 210. The audio sub-system 206 is operably coupled to a terminal voice transfer interface 212, which is operably coupled to a voice transfer interface 214, via connection 215, within the network element 204. The terminal 200 also has a terminal session controller 216 operably coupled to a network element session controller 218 within the network element 204. During the initiation of a multi-modal session, the terminal session controller 216 and the network session controller 218, which may be implemented in either hardware or software, exchange initialization commands 219 to provide for communication between the terminal 200 and the network element 204. Initialization commands 219, such as address locations for specific elements disposed within the terminal and network element, facilitate active communication between the terminal 200 and the network element 204.

Further resident on the terminal is a graphical browser with per session proxy evaluator 220 operably coupled to a multi-modal synchronization interface 222. The multi-modal synchronization interface 222 is operably coupled to a multi-modal synchronization coordinator 122 via connection 223 and the graphical browser with graphical browser per session proxy evaluator 220 is operably coupled to the multi-modal session proxy server 226, also resident on the network element 204. Similar to the multi-modal session proxy server 110 of FIG. 1, the multi-modal session proxy server 226 of FIG. 3 is one of a plurality of multi-modal session proxy servers designated as the session specific multi-modal session proxy server 226. Moreover, the multi-modal synchronization coordinator 122 is operably coupled to the multi-modal session proxy server 226 via connection 227.

The graphical browser with graphical browser per session multi-modal proxy evaluator 220 is operably coupled to the multi-modal session proxy server 226 allowing information transfer therebetween, as illustrated across the general bus 228. The multi-modal session proxy server 226 initially provides the multi-modal proxy identifier 229 to the graphical browser with per session multi-modal proxy evaluator 220. The graphical browser with per session multi-modal proxy evaluator 200 evaluates the multi-modal proxy identifier, and updates the graphical browser proxy identifier (not shown) if required.

Resident within the network element 204 is a speech engine 230 operably coupled to the voice transfer interface 214 via connection 225. The speech engine 230 is further operably coupled to a voice browser with per session multi-modal proxy evaluator 232, via connection 231. When a user wishes to utilize the voice browser with per session multi-modal proxy evaluator 232, an input command is spoken into the microphone 208 on the terminal 200. The spoken request is encoded and then provided to the terminal voice transfer interface 212 where it is forwarded to the network element voice transfer interface 214. The speech may be encoded using Pulse Code Modulation, or any other suitable encoding scheme as recognized by one skilled in the art. The spoken request is then provided to the speech engine 230 where it is converted and provided to the voice browser with per session multi-modal proxy evaluator 232.

Similar to the graphical browser with per session multi-modal proxy evaluator 220, the voice browser with per session multi-modal proxy evaluator 232 is operably coupled to a multi-modal synchronization interface 234. The multi-modal synchronization interface 234 is further coupled to the multi-modal synchronization coordinator 122 via connection 237. Also, the voice browser with per session multi-modal proxy evaluator 232 is operably coupled to the multi-modal session proxy server 226. During initiation of a multi-modal session, the multi-modal session proxy server 226 provides the multi-modal session proxy identifier (not individually designated) along bus 235 to the voice browser, whereupon the voice browser with per session multi-modal proxy evaluator 232 evaluates the browser proxy identifier, as discussed with reference to FIG. 2.

Further illustrated in FIG. 3, the multi-modal session proxy server 226 is operably coupled to a controller 236, which operably coupled to a load balancer 238. As recognized by one of ordinary skill in the art, the controller 236 and load balancer 238 may also be resident within the multi-modal session proxy server 226. The load balancer 238 determines the available bandwidth for the plurality of multi-modal session proxy servers 226. Based on information from the load balancer 238, the controller 236, which may be implemented in either hardware or software, determines which multi-modal session proxy server 226 may be used for the multi-modal session. The controller 236 determines the multi-modal session proxy server 226 based on a variety of factors, including, but not limited to, available bandwidth and location of the proxy servers.

In another embodiment of the present invention, each of the at least one multi-modal session proxy servers contains a controller and a load balancer. The load balancer provides the controller the requisite bandwidth availability information, whereupon the controllers from the various multi-modal proxy servers interact with each other to determine the optimum session specific multi-modal session proxy server, as discussed with reference to FIG. 4.

Once the initialization steps for the multi-modal session have been completed, a user may then enter an information request through one of the plurality of browsers with per session multi-modal proxy evaluators, such as 220 or 232. For example, a voice command request may be received by the microphone 208 and provided to the voice browser with per session multi-modal proxy evaluator 232, via the plurality of voice transfer interfaces 212, 214 and the speech engine 230. The information request is provided to the multi-modal session proxy server 226 designated by the browser proxy identifier.

The information request is retrieved via the multi-modal session proxy server 226, from a content server 240 operably coupled to the network element 204. As recognized by one skilled in the art, the content server may be resident within the network itself or a commercially available content server, such as a weather database or a search engine, operably coupled via the internet, intranet, or other suitable network. The information request is routed to the content server 240 and the information is retrieved and provided to one of the browsers with per session multi-modal proxy evaluator 220 or 232.

Concurrent with the successful retrieval of the information request, the multi-modal session proxy server 226 notifies the multi-modal synchronization coordinator 122. The multi-modal synchronization coordinator 122 notifies the multi-modal synchronization interface (such as 234 or 222) of the browser with per session multi-modal proxy evaluator that did not receive the requested information (such as 220 or 232 respectively). The browser that did not receive the requested information may then access the requested information from the multi-modal session proxy server 226. Thereupon, both browsers with per session proxy evaluators, 220, 232 will be synchronized.

The present invention enables multiple browsers, such as 220 and 232, in a multi-modal session to be synchronized, through the multi-modal proxy server 226. In conjunction with the multi-modal synchronization coordinator 122 and the multi-modal synchronization interface, 222 and 224, for each of the plurality of browsers with per session multi-modal proxy evaluators 220, 232, the system 201 can efficiently provide information requests to a plurality of third party content servers, such as 240. The present invention provides for a session specific multi-modal proxy server to be determined on a per session basis, thereupon providing an improved information transfer system via an optimum multi-modal session proxy server with optimum bandwidth capabilities, among other things.

Figure 4:
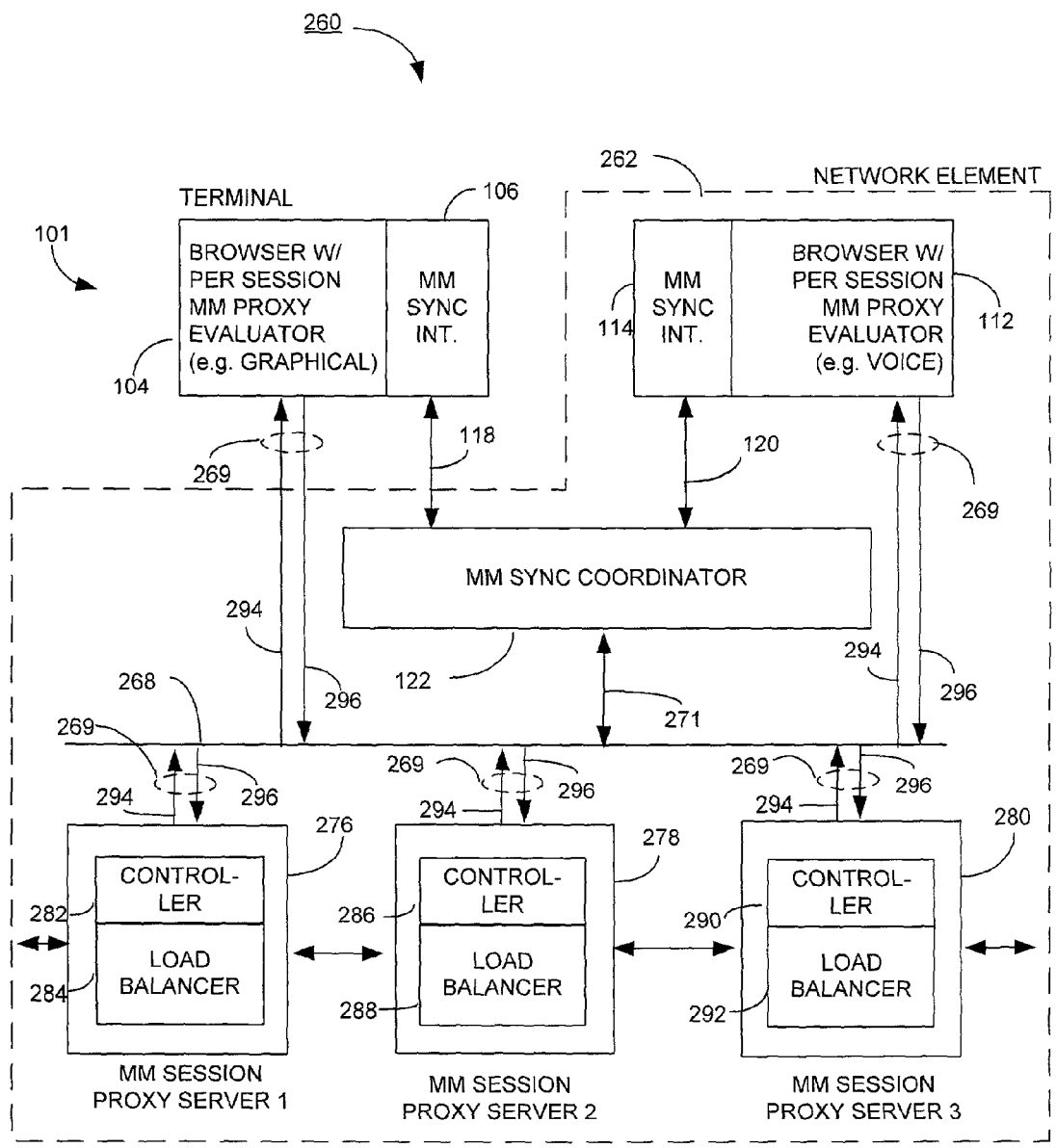
FIG. 4 illustrates a plurality of browsers operably coupled to a plurality of multi-modal session proxy servers, in accordance with one embodiment of the present invention.

FIG. 4 illustrates another representation of the plurality of multi-modal session proxies prior to a session specific multi-modal proxy being determined. The system 260 comprises a terminal 101 and a network element 262. The terminal 101 has a browser with per session multi-modal proxy evaluator 104, such as a graphical browser, operably coupled to a multi-modal synchronization interface 106. The browser with per session multi-modal proxy evaluator 104 is operably coupled to a central bus 268, via bus 269, or any other suitable connection, and the multi-modal synchronization interface 106 is operably coupled to a multi-modal synchronization coordinator 122 via connection 118.

Resident within the network element 262 is a browser with per session multi-modal proxy evaluator 112, such as a voice browser. The browser with per session multi-modal proxy evaluator 112 is operably coupled to a multi-modal synchronization interface 114. The multi-modal synchronization coordinator 112 is further coupled to the bus 269 via connection 271. The browser with per session multi-modal proxy evaluator 112 is further coupled to the bus 268 via bus 269, or any other suitable connection, and the multi-modal synchronization interface 114 is operably coupled to the multi-modal synchronization coordinator 122 via connection 120.

Also illustrated within the network element are a plurality of a multi-modal session proxy servers 276, 278 and 280 operably coupled to the bus 268, via bus 269 or any other suitable connection. As recognized by one of ordinary skill in the art, FIG. 4 illustrates three multi-modal session proxy servers, whereas any number of a plurality of proxy servers may be resident and operably coupled to the bus 268. Resident within each of the multi-modal session proxy servers is a controller 282, 286 and 290 and a load balancer 284, 288 and 292, respectively.

As discussed with reference to FIG. 3, the controller (282, 286 and 290) resident within each multi-modal session proxy server (276, 278, and 280) determines, from the load balancer (284, 288 and 292), the amount of available bandwidth for the multi-modal session proxy server (276, 278 and 280). The controllers interact with each other to determine the proxy either having the most available bandwidth or the most efficient information transferability with respect to the terminal and other network elements.

During a session initiation, the controllers between the various proxies provide for the determination of the multi-modal session proxy. The controller then provides the multi-modal session proxy identifier 294 to the browsers for evaluation to potentially update the browser proxy identifiers corresponding to the determined multi-modal session specific proxy. Once a multi-modal session proxy server is designated and the browser proxy identifiers having been evaluated in view of the multi-modal session proxy identifier, the user may provide information requests 296 similar to the system of FIG. 3 through the browsers with per session multi-modal proxy evaluators 104 and 112.

In one embodiment of the present invention, as illustrated in FIG. 1, wherein the network element contains a plurality of multi-modal synchronization coordinators, one of which is designated for the multi-modal session, the multi-modal proxy server must designate a specific multi-modal synchronization coordinator 122. In this embodiment, within the multi-modal session proxy server, is resident a database containing the addresses of the plurality of multi-modal synchronization coordinators and a plurality of protocols for accessing the multi-modal synchronization coordinators. Wherein, the protocols include programming instructions to notify the multi-modal synchronization coordinator to be utilized for the multi-modal session.

Figure 5:
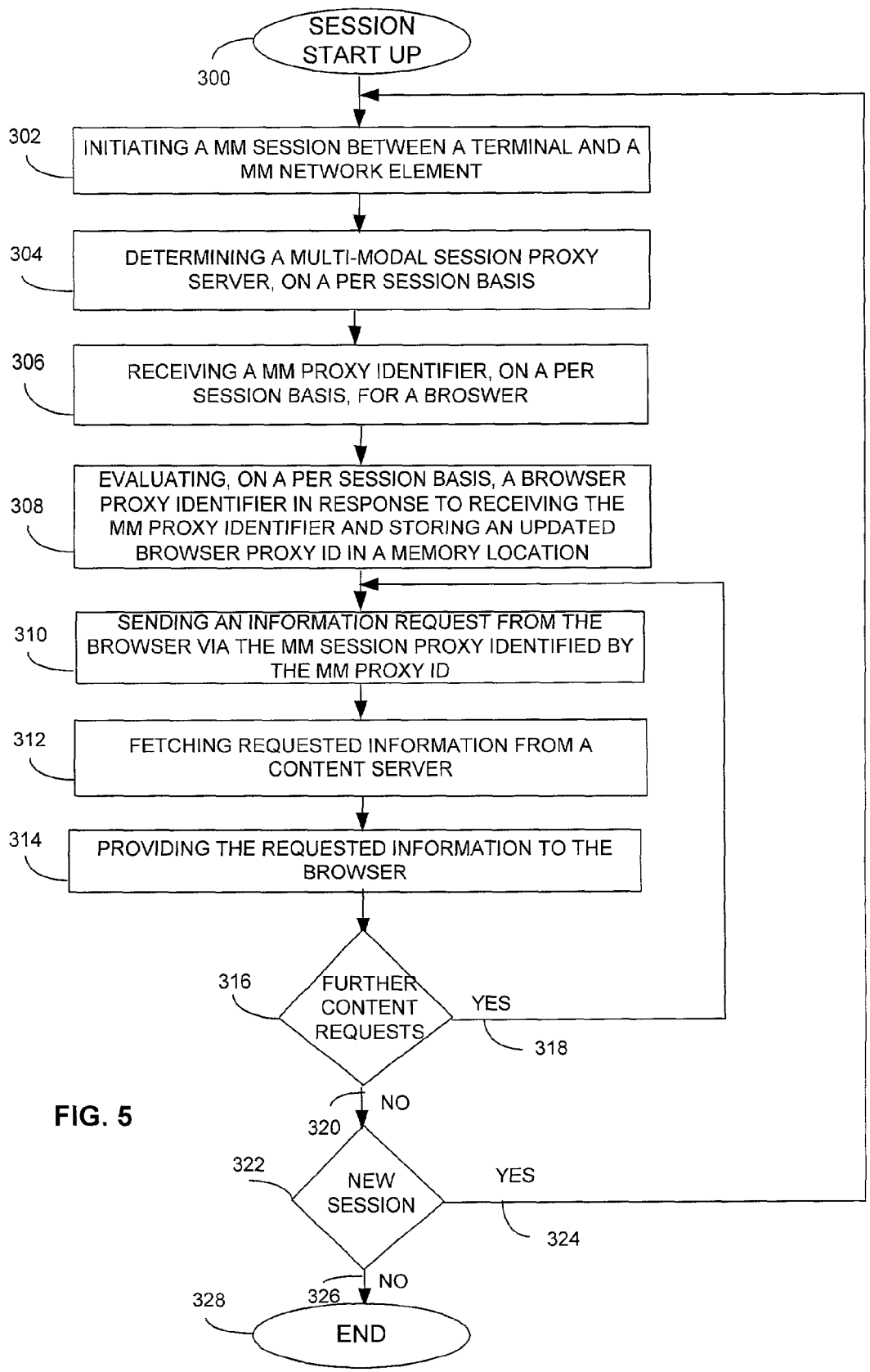
FIG. 5 illustrates a flow chart representing a method for multi-modal communication using a session specific proxy server, in accordance with one embodiment of the present invention.

FIG. 5 illustrates the steps for multi-modal communication, in accordance with an embodiment of the present invention, upon the start up of a multi-modal session 300. The first step is initiating a multi-modal session between a terminal and a multi-modal network element 302. Once the session has been initiated, the network element determines a multi-modal session proxy server on a per session basis, designated at 304. As discussed above, this determination may be based on optimization of, at least, available bandwidth between at least one multi-modal session proxy server having a controller and load balancer.

The terminal receives a multi-modal proxy identifier from the multi-modal session proxy on a per session basis, designated at 306. In one embodiment of the present invention, the determination of the multi-modal session proxy server and the transmission of the multi-modal proxy identifier occur during session initiation. The next step 308 is evaluating, on a per session basis, a browser proxy identifier resident within the browser, in response to receiving the multi-modal proxy identifier from the multi-modal session proxy.

The user may then send an information request to the multi-modal session proxy identified by the multi-modal proxy identifier, submitting this request through one of the plurality of browsers with per session multi-modal proxy evaluators, as discussed with reference to FIG. 3, designated at 310. Within the multi-modal session, the requested information is then fetched from a content server, designated at step 312, via the multi-modal session proxy server. Once the requested information has been retrieved, it is provided to the appropriate browser, designated at step 314. Moreover, the multi-modal synchronization coordinator synchronizes the other multi-modal browsers of the retrieved information request.

The requested information is then provided to the user via the browser whereupon the user may then enter another information content request, step 316. If another request, designated at 318, is provided, once again the browser sends the information request to the multi-modal session proxy identified by the multi-modal proxy identifier, step 310, wherein the URI request is fetched and provided to the browser.

If no further content requests are provided 320, a determination must be made whether the session is terminated and a new session in initiated, designated at step 322. If another session is initiated, designated at 324, the system once again initiates a multi-modal session between a terminal and a network element, designated at step 302. If the session is terminated, and a new session is not initiated, the multi-modal communication session is completed, designated at step 328.

In one embodiment of the present invention, at the termination of the multi-modal session, the multi-modal proxy identifier provided to the browsers at the initiation of the multi-modal session is explicitly deleted from the memory, such as memory 142 in FIG. 2. In this embodiment, the multi-modal session proxy server sends a null address which is treated by the browser as an updated multi-modal proxy identifier.

Figure 6:
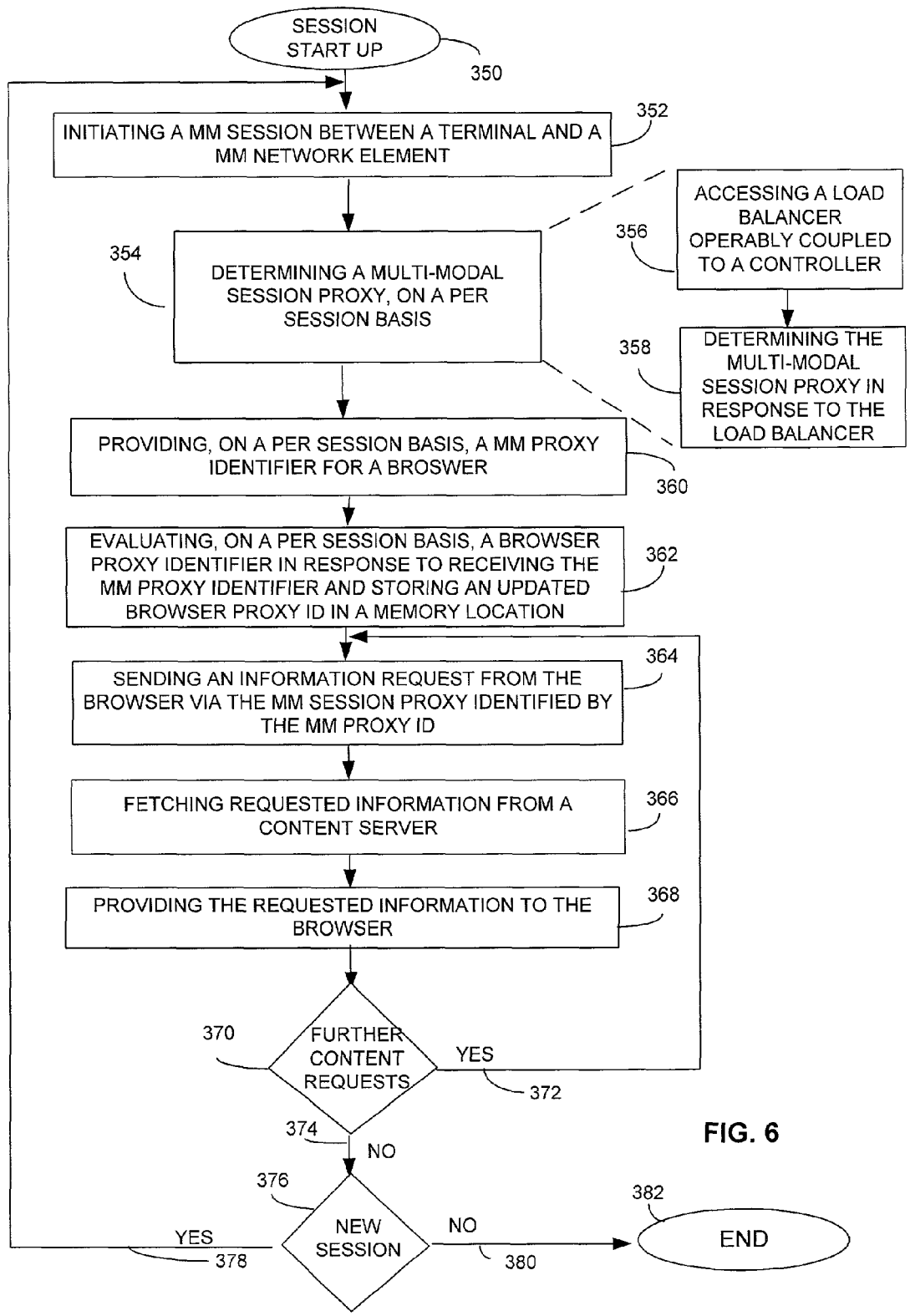
FIG. 6 illustrates a flow chart representing a method for the dynamic evaluation of a multi-modal session proxy server, in accordance with one embodiment of the present invention.

Referring to FIG. 6, a method for multi-modal communication includes the steps of starting up a session 350 and initiating a multi-modal session between a terminal and a multi-modal network element, designated at step 352. The next step is determining a multi-modal session proxy, on a per session basis, designated at step 354. This step is composed of two separate steps: accessing a load balancer operably coupled to a controller within the multi-modal session proxy step 356; and determining the multi-modal session proxy in response to the load balancer, step 358.

Once the multi-modal session proxy has been determined, a multi-modal proxy identifier is provided, on a per session basis to the browser, designated at step 360. On a per session basis, a browser proxy identifier is evaluated in response to receiving the multi-modal proxy identifier, step 362. Similar to the steps illustrated in FIG. 5, the network element receives an information request from the browser directed to the multi-modal session proxy which is identified by the multi-modal proxy identifier, step 364. The requested information is fetched from a content server operably coupled to the network element, step 366. And the requested information is then provided to the user via the browser, step 368.

If further content requests 370, are provided, designated at 372, the requests are once again provided from the browser and routed through the multi-modal session proxy identified by the multi-modal proxy identifier, step 364. Furthermore, the requested information is then fetched and provided to the user via the browser. In the event that no further content requests are provided, designated at step 374, a determination is made as to whether a new session is initiated, designated at 376. If another session is initiated, step 378, a new multi-modal session is initiated between the terminal and the network element, step 352. Otherwise, if a new session is not initiated, step 380, the method is ended, 382.

FIGS. 7 and 8 illustrate the steps taken in a multi-modal session having a session specific proxy identifier coupled to a graphical browser and a voice browser. FIG. 7 provides for a multi-modal session with a graphical browser. Upon the initiation of the multi-modal session 400, wherein the multi-modal session proxy has been determined and evaluated by the browser, the user enters an information request, such as a URI, into the graphical browser, designated at step 402. Typically, the user will enter information via the keypad through either typing actual text or using a scroll menu to select a particular menu item. Next, the graphical browser sends the fetch request to the multi-modal session proxy identified by the multi-modal proxy identifier, designated at step 404. The multi-modal proxy fetches the information request on behalf of the graphical browser, retrieving markup encoded information, step 406.

The multi-modal session proxy then provides the retrieved information to the graphical browser, where the browser decodes the information to be provided to the user, step 408, i.e. visually displayed on a screen. Similar to the systems illustrated in FIGS. 1-4, once the information has been successfully retrieved and provided to the user, the multi-modal synchronization coordinator updates the voice browser via the voice browser's multi-modal synchronization interface providing the graphical browser requested information to the voice browser for synchronization, step 410. Once the voice browser has been updated, the fetch request is fully completed, step 412.

FIG. 8 illustrates a multi-modal session specific fetch request with regards to a voice browser. Upon the initiation of a multi-modal session, step 420, the user speaks an information request into a microphone within an audio sub-system resident on the terminal, step 422. The request is provided to a speech engine resident on the network element via a plurality of voice transfer interfaces on the terminal and network element, step 424. As recognized by one of ordinary skill in the art, the speech engine may be disposed on the terminal as well as on the network element.

The speech engine then decodes the spoken information request and provides this request to the voice browser, which thereupon sends the information fetch request to a multi-modal session proxy designated by the multi-modal proxy identifier, step 426. Similar to FIG. 7, the multi-modal proxy fetches the requested information on behalf of the browser, returning markup encoded information, step 428.

Once the information has been retrieved, the multi-modal session proxy provides the information to the voice browser, where the browser decodes the information to be provided to the user, step 430. The voice browser provides the information to a speech engine, which then converts the information into audible text and provides the output to a speaker within the audio sub-system of the terminal, via the plurality of voice transfer interfaces.

In the final step of the multi-modal proxy voice fetch request, the multi-modal synchronization coordinator updates the graphical browser, via the graphical browser multi-modal synchronization interface, of the voice browser requested information retrieval, step 432. Once the graphical browser has been properly updated, the request has been completed, 434.

Figure 9:
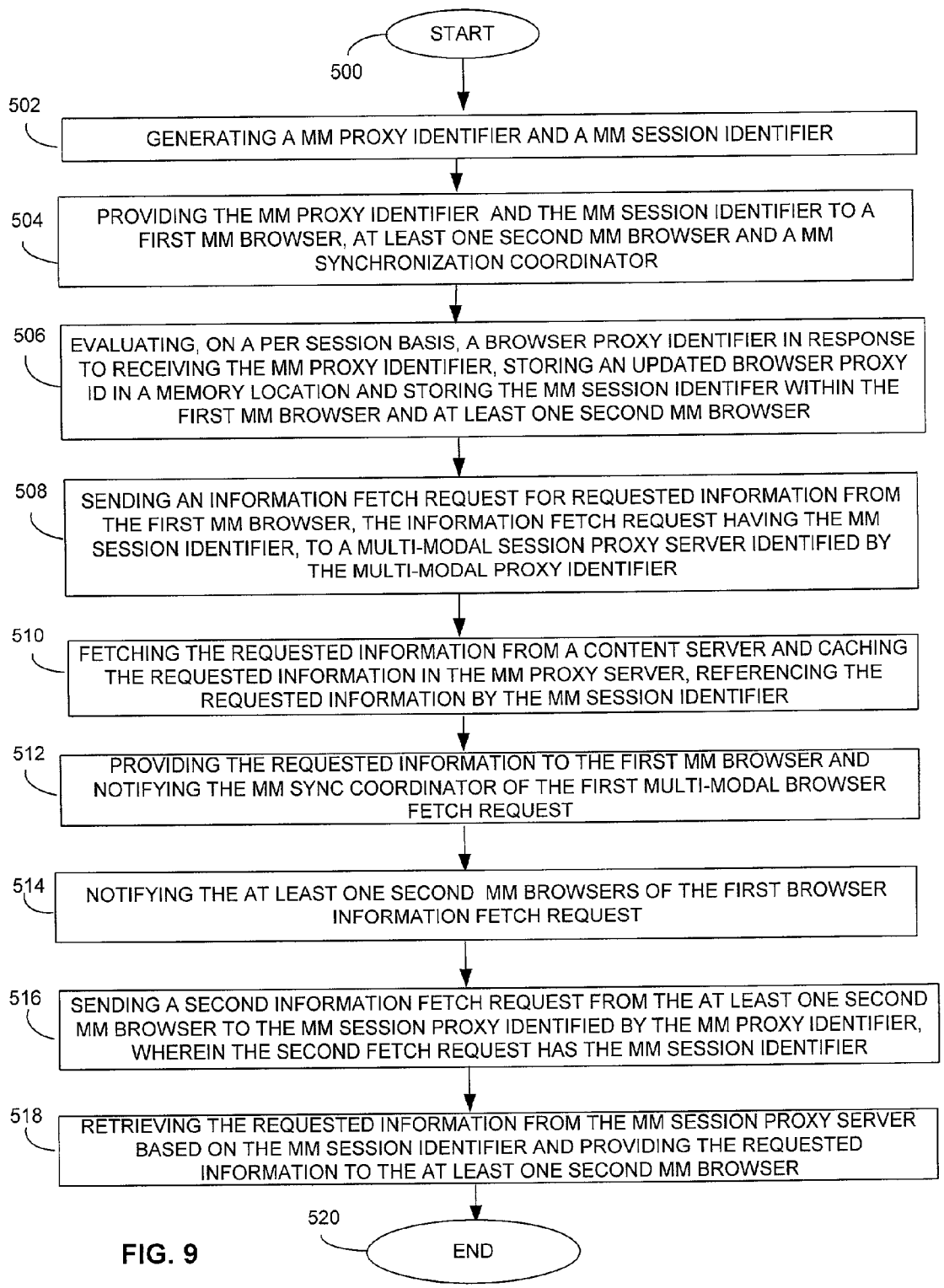
FIG. 9 illustrates a flow chart representing a method multi-modal communication using a session specific proxy server and a multi-modal session identifier, in accordance with one embodiment of the present invention.

FIG. 9 illustrates another embodiment of the present invention, specifically the usage of a multi-modal session identifier in conjunction with a multi-modal session specific proxy server. Initially, step 500, the multi-modal session proxy server generates a multi-modal proxy identifier and a multi-modal session identifier, designated at step 502. The multi-modal session identifier is a reference indicator identifying the specific multi-modal session for which the multi-modal proxy identifier is designated.

Next, step 504, the multi-modal proxy identifier and the multi-modal session identifier are provided to a first multi-modal browser, at least one second multi-modal browser and a multi-modal synchronization coordinator, such as elements 104, 112 and 122, respectively, of FIG. 4. On a per session basis, a browser proxy identifier is evaluated in response to receiving the multi-modal proxy identifier and an updated browser proxy identifier is stored in a memory location. Also, the multi-modal session identifier is stored within the first multi-modal browser and the at least one second multi-modal browser, designated at step 506.

An information fetch request for request information is sent from the first browser to a multi-modal session proxy identified by the multi-modal proxy identifier, the information fetch request having the multi-modal session identifier, designated at step 508. As recognized by one skilled in art, the multi-modal session identifier may be contained within the body of information fetch request or inherent in the request itself, based on the multi-modal proxy identifier. Next, step 510, the requested information is fetched from a content server and cached in the multi-modal proxy server, referencing the requested information by the multi-modal session identifier.

The requested information is provided to the first multi-modal browser and the multi-modal synchronization coordinator is notified of the first multi-modal browser fetch request, designated at step 512. Thereupon, the at least one second multi-modal browser is notified of the first browser information fetch request, designated at step 514. The at least one second multi-modal browser then sends a second information fetch request to the multi-modal session proxy identified by the multi-modal proxy identifier, wherein the second fetch request includes the multi-modal session identifier, designated at step 516.

The requested information is retrieved from the multi-modal session proxy server based on the multi-modal session identifier and provided to the at least one second multi-modal browser, designated at step 518. Whereupon, the first multi-modal browser and the at least one second multi-modal browsers are coordinated and the method is completed, step 520.

The multi-modal session identifier allows the multi-modal session proxy to cache and reference the information fetch request(s) based on the session identifier. This embodiment allows the multi-modal proxy server to maintain a plurality of multi-modal sessions and to efficiently cache the requested information and allow for the coordination of the multi-modal browsers on a per session basis.

The present invention provides for the improved efficiency of a multi-modal session by dynamically designating a session specific proxy upon the initiation of a multi-modal session. A session specific proxy which is chosen on a per session basis based on available bandwidth or other optimization parameters can more efficiently handle the users fetch request. Therefore, the present invention improves a multi-modal session through improved information transfer efficiency.

It should be understood that the implementation of other variations and modifications of the invention in its various aspects will be apparent to those or ordinary skill in the art, and the invention is not limited by the specific embodiments described. For example, functional components relating to the voice browser may be resident on the terminal instead of on the network element. It is therefore contemplated to cover by the present invention any known modifications, variations, or equivalents that fall within the spirit and scope of the basic underlying principles disclosed and claimed herein.

What is claimed is:

1. An apparatus for multi-modal communication comprising:
    a controller operative to select one or more of a plurality of multi-modal session proxy servers; and
    the plurality of multi-modal session proxy servers each having a proxy address, wherein the controller determines, on a per session basis, which of a plurality of multi-modal proxy identifiers represents the proxy address of a selected multi-modal session proxy server of the plurality of proxy servers.

2. The apparatus of claim 1 further comprising:
at least one browser having a per session multi-modal proxy evaluator and a browser proxy identifier, wherein the browser is operably coupled to the controller and the selected one of the plurality of multi-modal session proxy servers such that the browser receives the multi-modal proxy identifier and the browser proxy identifier is evaluated by the multi-modal proxy evaluator, on a per session basis, in response to the multi-modal proxy identifier.

3. The apparatus of claim 1 further comprising:
at least one voice browser having a voice browser per session multi-modal proxy evaluator and a voice browser proxy identifier, wherein the voice browser is operably coupled to the controller and the selected one of the plurality of multi-modal session proxy servers such that the voice browser receives the multi-modal proxy identifier and the voice browser proxy identifier is evaluated by the voice browser per session multi-modal proxy evaluator, on a per session basis, in response to the multi-modal proxy identifier; and at least one graphical browser having a graphical browser per session multi-modal proxy evaluator and a graphical browser proxy identifier, wherein the graphical browser is operably coupled to the controller and the selected multi-modal session proxy server such that the graphical browser receives the multi-modal proxy identifier and the graphical browser proxy identifier is evaluated by the graphical browser per session multi-modal proxy evaluator, on a per session basis, in response to the multi-modal proxy identifier.

4. The apparatus of claim 1 wherein the controller further comprises at least one load balancer, whereupon the controller determines the multi-modal proxy identifier of a plurality of multi-modal proxy identifiers in response to the at least one load balancer.

5. A method for multi-modal communication comprising:
receiving a multi-modal proxy identifier, on a per session basis, for a browser based on a selection from a plurality of multi-modal proxy servers;
evaluating, on a per session basis, a browser proxy identifier in response to receiving the multi-modal proxy identifier;
sending an information request using a first mode via a multi-modal session proxy server identified by the multi-modal proxy identifier; and
receiving a reply to the request in a second mode using the proxy server.

6. The method of claim 5 further comprising:
fetching requested information from at least one content server; and
providing the requested information to the browser.

7. The method of claim 6 further comprising:
prior to sending an information request, storing an updated browser proxy identifier in a memory location.

8. A method for multi-modal communication comprising:
selecting one of a plurality of multi-modal session proxy servers, on a per session basis;
providing, on a per session basis, a multi-modal proxy identifier of the selected one of the plurality of multi-modal proxy identifiers to a browser; and
determining a multi-modal session proxy server, on a per session basis, further comprising:
accessing a load balancer, wherein the load balancer is operably coupled to a controller; and
determining the multi-modal session proxy server, by the controller, on the per session basis in response to accessing the load balancer.

9. The method of claim 8 further comprising:
prior to determining a multi-modal session proxy server, on a per session basis, initiating a multi-modal session between a terminal and a multi-modal network element.

10. The method of claim 9 further comprising:
evaluating, on a per session basis, a browser proxy identifier in response to receiving the multi-modal proxy identifier; and
receiving an information request from the browser to the multi-modal session proxy server identified by the multi-modal proxy identifier.

11. The method of claim 9 further comprising:
fetching requested information from a content server; and
providing the requested information to the browser.

12. An apparatus for multi-modal communication comprising:
a controller operative to select one or more of a plurality of multi-modal session proxy servers;
the plurality of multi-modal session proxy servers each having a proxy address, wherein the controller determines, on a per session basis, which of a plurality of multi-modal proxy identifiers represents the proxy address of a selected multi-modal session proxy server of the plurality of proxy servers;
at least one voice browser having a voice browser per session multi-modal proxy evaluator and a voice browser proxy identifier, wherein the voice browser is operably coupled to the controller and the selected one of the plurality of multi-modal session proxy servers such that the voice browser receives the multi-modal proxy identifier and the voice browser proxy identifier is evaluated by the voice browser per session multi-modal proxy evaluator, on a per session basis, in response to the multi-modal proxy identifier;
at least one graphical browser having a graphical browser per session multi-modal proxy evaluator and a graphical browser proxy identifier, wherein the graphical browser is operably coupled to the controller and the selected multi-modal session proxy server such that the graphical browser receives the multi-modal proxy identifier and the graphical browser proxy identifier is evaluated by the graphical browser per session multi-modal proxy evaluator, on a per session basis, in response to the multi-modal proxy identifier;
at least one graphical browser multi-modal synchronization interface operably coupled to the graphical browser;
at least one voice browser multi-modal synchronization interface operably coupled to at least one voice browser; and
at least one multi-modal synchronization coordinator operably coupled to the graphical browser multi-modal synchronization interface, the voice browser multi-modal synchronization interface and the multi-modal session proxy, wherein multi-modal session proxy server allows the multi-modal synchronization coordinator to synchronize the at least one graphical browser and the at least one voice browser.

13. An apparatus for multi-modal communication comprising:
a controller operative to select one or more of a plurality of multi-modal session proxy servers;
the plurality of multi-modal session proxy servers each having a proxy address, wherein the controller determines, on a per session basis, which of a plurality of multi-modal proxy identifiers represents the proxy address of a selected multi-modal session proxy server of the plurality of proxy servers;

at least one voice browser having a voice browser per session multi-modal proxy evaluator and a voice browser proxy identifier, wherein the voice browser is operably coupled to the controller and the selected one of the plurality of multi-modal session proxy servers such that the voice browser receives the multi-modal proxy identifier and the voice browser proxy identifier is evaluated by the voice browser per session multi-modal proxy evaluator, on a per session basis, in response to the multi-modal proxy identifier;

at least one graphical browser having a graphical browser per session multi-modal proxy evaluator and a graphical browser proxy identifier, wherein the graphical browser is operably coupled to the controller and the selected multi-modal session proxy server such that the graphical browser receives the multi-modal proxy identifier and the graphical browser proxy identifier is evaluated by the graphical browser per session multi-modal proxy evaluator, on a per session basis, in response to the multi-modal proxy identifier;

at least one graphical browser multi-modal synchronization interface operably coupled to the graphical browser;

at least one voice browser multi-modal synchronization interface operably coupled to at least one voice browser;

at least one multi-modal synchronization coordinator operably coupled to the graphical browser multi-modal synchronization interface, the voice browser multi-modal synchronization interface and the multi-modal session proxy, wherein multi-modal session proxy server allows the multi-modal synchronization coordinator to synchronize the at least one graphical browser and the at least one voice browser;

at least one information request provided by at least one of the at least graphical browser and the at least one voice browser to the multi-modal session proxy server whereby the multi-modal session proxy server fetches requested information from a content server; and wherein if the requested information is provided to the at least one voice browser, the at least one graphical browser is updated via the at least one graphical browser multi-modal synchronization interface through the multi-modal synchronization coordinator and if the requested information is provided to the at least one graphical browser, the at least one voice browser is updated via the voice browser multi-modal synchronization interface through the multi-modal synchronization coordinator.

\* \* \* \* \*